United States Patent [19]

Ryckeboer

[11] Patent Number: 4,584,575

[45] Date of Patent: Apr. 22, 1986

[54] METHOD AND DEVICE FOR THE ASYNCHRONOUS SERIES COMMUNICATION ON THE MULTIPOINT TYPE OF A PLURALITY OF LOGIC TRANSCEIVERS

[76] Inventor: Christian Ryckeboer, 2, av Bouvard, 74000 Annecy, France

[21] Appl. No.: 464,499

[22] PCT Filed: Jun. 3, 1982

[86] PCT No.: PCT/FR82/00092

§ 371 Date: Jan. 31, 1983

§ 102(e) Date: Jan. 31, 1983

[87] PCT Pub. No.: WO82/04366

PCT Pub. Date: Dec. 9, 1982

[30] Foreign Application Priority Data

Jun. 5, 1981 [FR] France .............................. 81 11687

[51] Int. Cl.⁴ .............................................. H04Q 9/00
[52] U.S. Cl. ..................................... 340/825.5; 370/85
[58] Field of Search ................. 340/825.5; 370/85, 92, 370/93, 94

[56] References Cited

U.S. PATENT DOCUMENTS 4,210,780 7/1980 Hopkins et al. .................... 370/85
4,271,505 6/1981 Menot et al. ....................... 370/92
4,292,623 9/1981 Eswaran et al. ................ 340/825.5
4,332,027 5/1982 Malcolm et al. ..................... 370/85

FOREIGN PATENT DOCUMENTS 2306478 10/1976 France .
2013452 8/1979 United Kingdom .

OTHER PUBLICATIONS

EP0023105, Jan. 28, 1981, Hamshire, et al.

Primary Examiner—Donald J. Yusko
Attorney, Agent, or Firm—Roland Plottel

[57] ABSTRACT

Messages including an interruption character (12), a character designating the address of the sendee (13), a character designating the address of the sender (14), characters containing the useful information of the message (15, 16), and an interruption character (17) are communicated between a number of transceivers on a network. Each transceiver has circuitry to prevent transmission for a predetermined time (18) after reception of a character on the network. After each character emission, the sender compares the signals detected on the network with the signals to be transmitted and, in case of difference, ceases the transmission and generates an interruption character. Further transmission is then inhibited for a random period of time for each transceiver. Asynchronous communication, without the need for encoded clock signals in the messages, thus can be carried out on the network.

15 Claims, 7 Drawing Figures

METHOD AND DEVICE FOR THE ASYNCHRONOUS SERIES COMMUNICATION ON THE MULTIPOINT TYPE OF A PLURALITY OF LOGIC TRANSCEIVERS

BACKGROUND OF THE INVENTION

The present invention relates to data communication networks comprising transceiver devices, and particularly to networks permitting a communication of multipoint type in which each transceiver can communicate with each of all the other transceivers on the same network.

The data communication needs brought about by computer systems have caused the development of high speed telecommunications networks, in the Megabauds range, and the common usage of synchronous transmission techniques. In these techniques, the data signal coding scheme usually permits regeneration of a clock signal at the receiving side, which is to say that the transmitted data also carries the sender clock signal. The clock is used by the receiver to sample the incoming binary signal and deserialise the information. In this type of connection, all characters are emitted in continuous sequence without any intermediate pause and the transmission initialisation is generally characterised by the emission of a sequence of binary signals which are used by the receiver to synchronise itself. All transmission interruptions affect the loss of synchronisation of the receiver.

Using these synchronous transmission techniques, networks of multipoint type have been developed where the direct communication from sending to receiving equipment can be achieved. For this purpose, the equipment makes use of methods based on the contention principle, which is to say that each transceiver on the network can transmit when no other communication is in process. In all multipoint contention systems known today, the transmission type is synchronous, high speed, with carrier suppression during transmission pauses, so that all transceivers can identify very rapidly the free/busy state of the network.

French patent No. 2 306478 describes the following device: a message transmission starts with a synchronisation binary signal, and an interruption at any time is interpreted as end of the message, which puts the channel back in the quiescent state. This device can work only with a signal coding scheme which carries the clock of the sender, and the transmission is of synchronous type. The messages contain the addresses of the sender and of the receiver or addressee. In case of data collision on the network, the senders stop transmitting and restart transmission after a waiting time of random duration which, in practice, can be almost null. No collision signal is generated on the network.

European patent application No. 0 023105 also describes a device using the contention principle; in this device, the message is transmitted using a particular coding scheme containing packets of eight binary signals each. The transmission technique is of synchronous type, the message carries the clock, but no destination address is sent so that all transceivers on the network are addressees of all messages. The particular coding scheme enforces a wait of duration equivalent at least to a packet, before transmission can be retried after collision.

British patent application No. 2 013452 describes a device in which the last sender equipment designates the succeeding one; thus the devices are authorised to transmit one after the other in a modifiable succession. This is a technique quite different from the contention technique.

Asynchronous data transmission networks permit only lower speed implementations but are far less expensive. The identification of the availability of an asynchronous network is more delicate; this is why multipoint contention channels have never been developed. As a matter of fact in the asynchronous transmission technique, messages are composed of a sequence of characters separated by time intervals during which the carrier frequency is suppressed. Consequently the absence of the carrier frequency does not guarantee that a message is not being transmitted.

Therefore, in the networks which utilise the asynchronous communication technique, multipoint lines have been implemented where a master device polls the slave device to acquire the information it has to transmit, and selects the slave device to transmit to it the information it needs to receive. This approach leads to a hierarchical network architecture which is rather complex and inflexible.

SUMMARY OF THE INVENTION

The present invention overcomes some of the problems of the known networks, by providing a method and a device which permits the transmission of information at medium speed in an asynchronous mode between several logical transceivers, to implement networks with the following characteristics: lower cost compared to equivalent synchronous networks; multipoint configurations; direct communication between the sender and addressee.

In the following it will be assumed that the network is constituted of transceivers; each transceiver comprises an emitting and a receiving circuit. The transceiver which wants to transmit a message will be called sender, the transceiver to which the message is being sent will be called addressee.

Another object of this invention is to provide a method and a device which permits the implementation of networks where the physical location and the quantity of transceivers can be easily changed on the network.

Another object of this invention is to provide a method and a device which permits the implementation of networks where the messages' content can be freely changed.

Another object of this invention is to provide a method and a device which permits the implementation of networks using logic circuits well known and commonly used today in the asynchronous point to point connections.

To achieve all the above, according to one feature of this invention, the device comprises the means necessary to implement the following steps: after reception of a character not directed to it, the equipment willing to transmit remains in a network listening state for a time longer than a minimum predetermined waiting time; if no signal is detected on the network during this time, the equipment emits a start of message signal; then it emits the characters constituting the message, which will contain at least the addresses of the addressee and of the sender; it then emits the end of message character; at each individual signal emission, the sender compares the signals corresponding to the emitted characters and the signal simultaneously detected listening to the network; if the signals are identical, the sender continues the message transmission; if the signals are different, the sender interrupts the message emission, generates a signal of interruption on the network, waits and listen for a random period greater than the minimum wait time, and starts the transmission again. Quite different from devices knwon today, this process permits utilisation of the contention mechanism for the asynchronous communication of multipoint type of logical messages, where these messages are made of a sequence of binary signals grouped in characters of the same length and separated by interruptions. Taking care of the different waiting delays reduces the probability of simultaneous message emissions by different sending stations.

According to another feature of this invention, the start message, stop message, and interruption signals of a message are substantially identical and, in addition, they utilise the same interrupt characters currently used in the asynchronous communication technique so that their identification can be done by classic circuits routinely used in point-to-point asynchronous communications. These interrupt characters comprise a continuous signal of longer duration in comparison with the characters used in the body of a message in such a way that they have a unique shape in respect of all characters constituting the message. Such a network protocol is independent of any coding scheme used for the transmittable message characters and can support most different applications.

According to another feature of this invention, the minimum predetermined waiting time is at least equal to the transmission time of a character as increased of the maximum processing time required by a transceiver between the end of transmission of a character and the beginning of emission of the next, and greater than the maximum propagation time of a signal between the extreme points of the network. This ensures that a non-reception of signals during the waiting time signifies that no message is being transmitted. In addition, if a component of the transceiver fails during transmission, the other transceivers wishing to send messages can access the network without waiting for the end of message, which would not otherwise happen but after repair of the failing transceiver.

During the phase of comparison at each station of the signals corresponding to the characters emitted and of the signals simultaneously detected while listening to the network, the comparison can be done at the end of a character. In this case two stations can start transmitting simultaneously and the error will only be detected at the end of the first or second character. Such risk can be reduced if comparisons are made at the end of the transmission of each binary signal contained in the character.

BRIEF DESCRIPTION OF THE DRAWING

Other features and advantages of the present invention will be clear from the following description of particular embodiments made with reference to the accompanying figures in which.

DETAILED DESCRIPTION OF THE INVENTION

Figure 1:
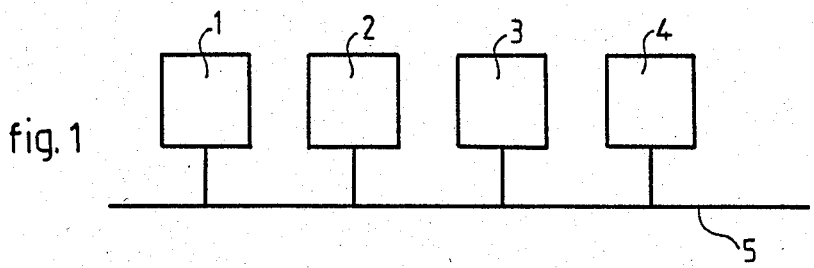
FIG. 1 shows schematically a network of transceivers according to this invention.

As indicated in the FIG. 1, the method described in this invention makes communications possible in an asynchronous mode between several transceivers connected to the same network. All the transceivers from 1 to 4 are connected in parallel to the same line 5. The scheme indicates only one line for simplicity and clarity but it is implied that two wires are in fact required. In addition, it will be possible to build networks communicating according to the method here described using other physical transmission media (microwave links, optical fibers, infrared beams), without going beyond the limits of the scope of the present invention.

In the serial asynchronous transmission techniques the data signal does not carry a clock signal, and this is why the characters are framed by special binary signals indicating the start and stop of a character. The addressee uses the binary signal of a start character to run its clock and its sampling mechanism. The sampling rate is set at a higher frequency to make sure that the synchronisation is adequate during the transmission of one character. This clock setting method is quite different from the synchronisation obtained with the binary signals for the start of transmission of synchronous transmissions.

Figure 2:
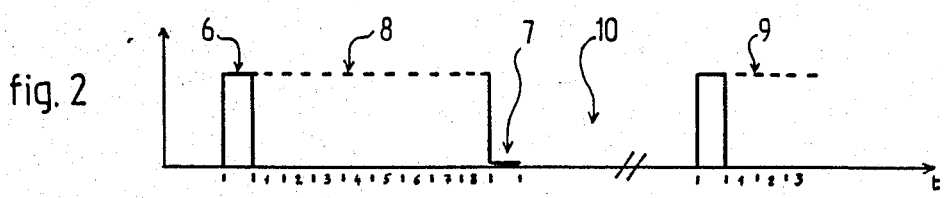
FIG. 2 shows an example of a typical waveform of a character transmitted by a network conforming to this invention.

FIG. 2 shows a possible character shape, which comprises a binary start signal 6, followed by eight binary signals whose coding identifies a character to be transmitted, the last binary signal is followed by a special binary stop character 7. The character 8 is separated from the following character 9 by an interval 10 of variable length. The duration of this interval 10 depends on the processing time required by the transmitter circuitry between two consecutive characters. The length of the characters 8 and 9 depends on the number of binary signals constituting these characters, typically between 5 and 8 binary signals plus an optional parity bit.

Figure 3:
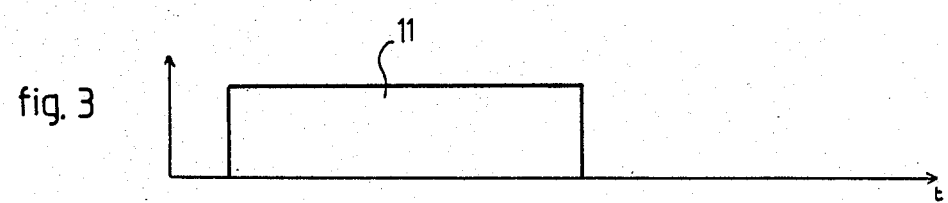
FIG. 3 shows a typical interruption signal waveform.

FIG. 3 represents, in association with FIG. 2, a special interruption character 11 which is continuous and has a longer duration than a normal character in the body of a message as defined in FIG. 2.

Figure 4:
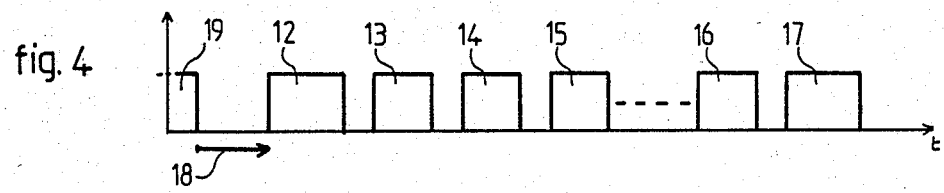
FIG. 4 shows the waveforms of a message to be transmitted according to this invention.

FIG. 4 represents a complete message conforming to the method which is the object of this invention. The message contains a start message signal 12, which will be preferably made of an interruption character 11, a second character 13 representing for instance the address of the message addressee, a third character 14 which represents the address of the sender, a series of characters, 15 to 16, representing the message itself, and a stop message signal 17, which will be preferably an interrupt character 11. All these characters are constituted according to the scheme described in connection with FIG. 2, and are separated by time intervals during which no signal is transmitted on the network.

Before initiating the transmission of a message as represented in FIG. 4, each sender has to wait for a waiting time, represented by the pointer 18, after identification of the last signal 19 on the network, and 18 must be longer than a predetermined waiting time. This minimum waiting time is larger or equal to the transmission time of a character on the network plus the average processing time of the emitter logic between the end of transmission of a character and the beginning of emission of the following one plus the signal propagation time between the extreme points on the network.

During the transmission of a message and at each emission of characters constituting this message, the sender compares the signals corresponding to the character to be transmitted with the signal simultaneously detected by listening to the network. If the two signals are identical, the sender carries on transmitting, sends an interruption message on the network and waits while listening to the network for a certain duration of time, and then starts transmission over again. The waiting time after collision must be different for all transceivers; in this way multiple systematic collisions can be avoided after a collision occurs with many senders waiting for transmitting. It is preferable that this waiting time, always larger than the minimum predetermined waiting time, has a random duration in order not to introduce hierarchy between the various transceivers.

This phase of the method avoids on one side the erroneous transmission of messages and, on the other side collisions from occuring when two or more transceivers start transmitting simultaneously. In the case of a collision, the first two characters transmitted by the two transceivers in collision are interruption characters so that each of the two transceivers detects the identity of the received and transmitted characters on the network. Each of the senders then continues the transmission, emitting the characters representing the address of the addressee.

In the case that the addresses of the addressees are different, the signals present on the network are made of the combination of the two signals emitted and a few possible combinations can happen:

The mixing of the informations yields a reading and-/or a parity error which causes the two senders to stop transmission, generate the interruption signal, wait for a random waiting time and then repeat the transmission of the same message;

If the information mixing and the apparent synchronism are such that a new character appears on the network representing a new address different from at least one of the addresses of the two emitting transceivers, an emitting transceiver will detect the error, generate an interruption signal forcing all emitting transceivers to stop their transmissions and wait for a random waiting time before attempting retransmission;

In case the mixing of the informations is such that the collision is not detected at this level, the senders will then transmit their own addresses which are necessarily different. In this case at least one of the senders will identify a mismatch and will generate the interruption.

During the phase of comparison of the signals corresponding to the emitted characters and to the signals simultaneously detected on the network, the match is checked at the end of each character. This leads to inexpensive implementations, by using common logic circuits to do the comparison. A comparison at the level of each binary signal of the characters is still possible.

During the initial listening phase, the sender must check that no message is being transmitted. This check can be made in two possible ways: one possible method is to check that no complete character has been received during the initial network listening period. In this case, the chances of collision are fairly high because it is likely that two transceivers will start transmitting during the transmission time of a character. A preferable method is to check that no character has been received during the initial listening time and that the network is in the quiescent state at the time the transceiver starts transmitting. In the second scheme the time during which a collision may happen is greatly reduced.

Figure 5:
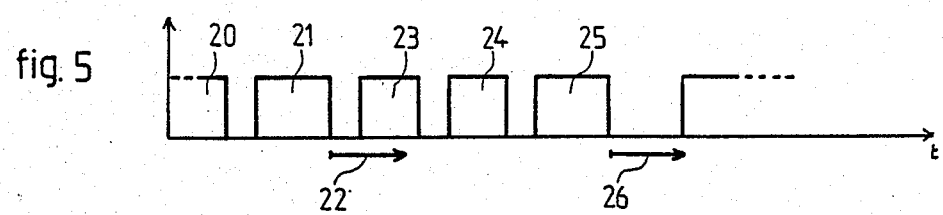
FIG. 5 shows the waveforms of another message to be transmitted according to the present invention.

The method according to this invention foresees also a step of generating an immediate acknowledge message which is sent by the addressee back to the sender in such a way as to keep the network busy for a minimum extra time. This acknowledge message can comprise a character designating the address of the sender, one designating the address of the addressee, a few optional information characters, and a final interruption character. The addressee generates the first acknowledge character before the end of the minimum predetermined waiting time which normally follows the interruption character signifying the end of message. In this way the addressee is the only transceiver granted permission to start transmitting before any other one and therefore it is not necessary that the acknowledge message starts with an interruption character. FIG. 5 shows a succession of the characters appearing on the network in connection with a message acknowledge: the last character 20 of the message of the sender is followed by the interruption character 21 which in turn is followed, during the minimum waiting time indicated by the pointer 22, by a first character 23 transmitted by the addressee and designating the address of the sender, by a second character 24 designating the address of the addressee itself and by the interruption character 25 indicating the end of the message acknowledge sequence. No other transmission can start before a new minimum predetermined waiting time 26.

In order to limit energy consumption of the transceiver, the active time of each of its subsystems can be kept to the minimum. For this purpose we can define a number of states of the transceiver:

during the quiescent state, only the subsystem which is capable of identifying the interruption character (coding scheme of the start or end of message), must be in an active state, and this can be easily implemented using a single timing circuit.

during the active state, the transceiver has identified a start message signal and waits for identification of the address character to determine if it is the addressee of the incoming message. This state can last only for the time necessary to detect the start message character and read the very first message character which carries the address of the addressee; if the transceiver does not recognise its own address it falls back in the quiescent state.

if instead the transceiver does recognise its address, it moves into a listening state in which the transceiver processing subsystem handles the incoming message up to reception of an end of message signal.

another possible state can be identified when the transceiver transmits a message or an acknowledge message on the network and keeps listening to the signals actually present on the network.

Figure 6:
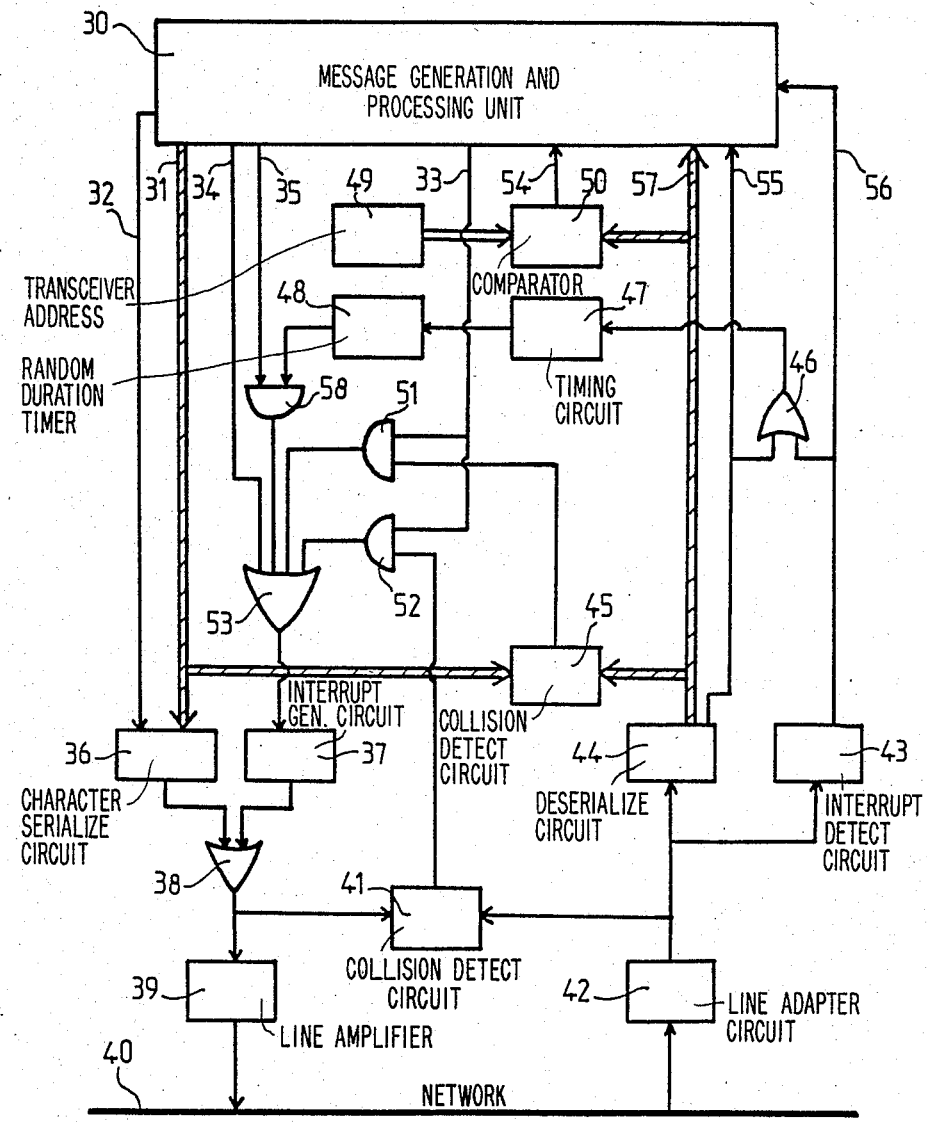
FIG. 6 shows schematically the principal functional elements of a transceiver on a network according to this invention.

FIG. 6 represents the most important functional elements of a transceiver according to this invention. This transceiver comprises a message generation and processing unit 30 which has a number of output lines 31 which carry the character to be transmitted onto a serialising circuit 36, an output line 32 which controls the transmission of the characters between the generation unit 30 and the serialising circuit 36, an output line 33 connected to one input of the logic AND gates 51 and 52 to validate the emission of the interrupt signal 11 in case of collision detection during the transmission phase, an output line 34 to command the transmission of the end of message signal 17, and an output line 35 to command the transmission of the start of message signal 12 through an AND gate 58. A circuit 37 which generates the start of message, end of message, and interrupt signals after collision detection, is triggered by the logic OR gate 53 which in turn receives as input lines the line 34 and the output lines of the AND gates 51, 52, 58. The input into the line amplifier 39, which carries the line signals onto the network 40, is the output of the OR gate 38 which receives as inputs the output of circuit 37 and the output of the character serialising circuit 36.

The message generation and processing unit 30 has also a number of input data lines 57 which carry the character received, an input line 55 which controls the transmission of the characters between a deserialising unit 44 and the processing unit 30, an input line 56 connected to the interrupt detect logic circuit 43, an input line 54 which is connected to the output of a comparator circuit 50 which compares the characters received on the input data lines 57 to the transceiver address defined by a circuit 49.

The deserialising circuit 44 and the interruption detection signal 43 are connected to the output of a line adapter circuit 42 which is in turn connected to the network 40.

An OR gate 46 whose input signals are the lines 55 and 56, detects the reception of a character or of an interruption signal and triggers a timing circuit 47 which inhibits the transmission of a new message before a minimum predetermined waiting time. The output of this timing circuit 47 triggers a random duration timer 48 which will authorise the transmission of the start of message signal on line 35 onto the OR gate 38, through the AND gate 58 and the OR gate 53.

In the figure are also represented collision detect circuits 41 or 45. The circuit 41 is used if the comparison between the received and transmitted signal is made after transmission of each binary signal and during the intervals between each character. The circuit 45 is used if the comparison is made after transmission of each character. The AND gates 51 and 52, enabled by the output line 33 of the generation and processing unit, permit the transmission of the collision detection signal towards the interruption generator circuit 37 through the OR gate 53.

Figure 7:
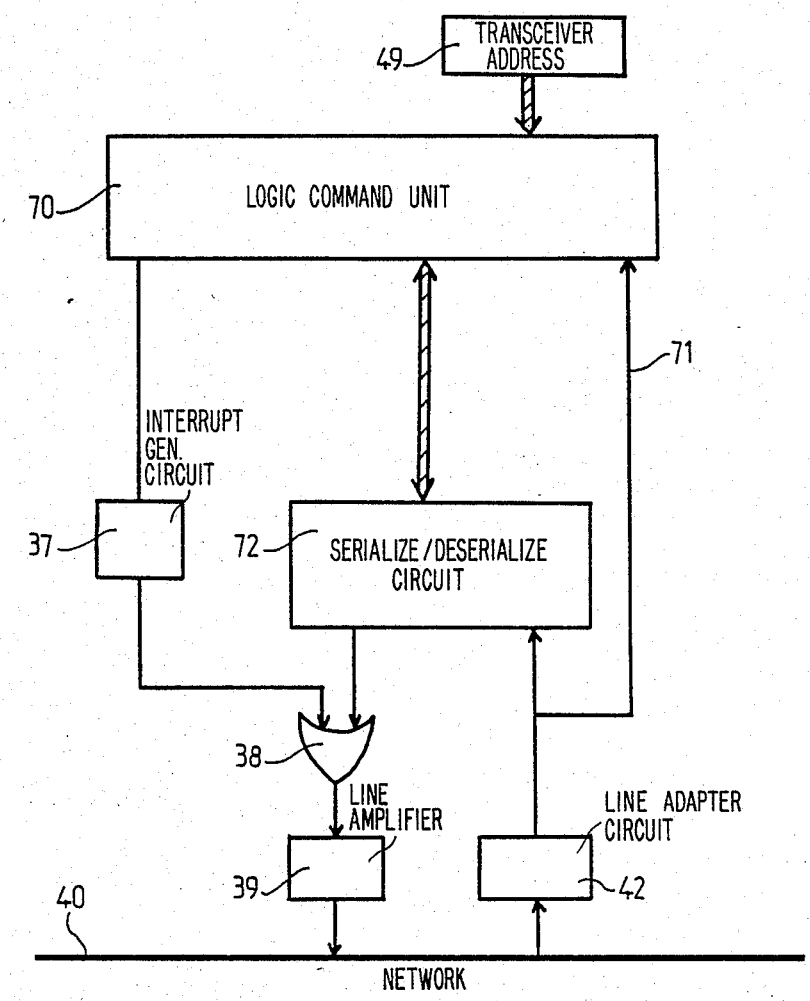
FIG. 7 shows schematically the principal components of a transceiver on a network according to this invention.

In the implementation described here, the transceiver circuits can be made of electronic means well known by specialists. For example, the message generation and processing unit 30 can be a type 6809 microprocessor made by Motorola. Such device contains a read only memory for storing a program, a random access memory to serve as a data buffer, and an interface (serial or parallel) to connect with user equipment. For this reason it is unnecessary to give here a detailed description of such circuits. In addition the implementation of all these functions can be obtained in a very simple fashion using microprocessor technology, which we will describe now with reference to FIG. 7. In this implementation approach, a logic command unit 70 performs the address recognition, characters comparison, collision detection, timing, information storage and transmission inhibit functions as above described. Unit 70 can be a type 6805 processing unit also made by Motorola. For this purpose the logic unit is connected on one side to the line adapter 42 by the line 71, which permits determination of the absence of emissions and possibly message collisions on the network 40, on another side to a serialising deserialising circuit 72 connected in turn to the network through the line amplifier 39 and the line adapter 42, and finally to the circuit 49 which defines the address of the transceiver. The serial/parallel converter circuits such as circuit 72 are currently used in data communication techniques, and a few of these usually carry a specialised line, not shown in the figure, able to generate internally the interruption signal 11. In case the circuit used is not capable of generating directly such command, a simple logic is indicated in FIG. 7 to generate it: the circuit 37 triggered by the logic unit 70 produces at the input of the OR gate 38 a continuous signal which is sent onto the network through the line amplifier 39 during a predetermined waiting time longer than a character duration. The gate 38 is then connected between circuit 72 and the line amplifier 39.

In the two embodiments, the logic command unit, 30 or 70, can prevent the inhibition of all emissions, in order to send a message acknowledge without waiting for the minimum predetermined waiting time.

The present invention is not limited to the embodiments which have been explicitly described, but it includes all different variations and generalisations contained in the scope of the following claims.

I claim:

1. A method of conducting asynchronous multipoint serial communication of binary data message signals between a plurality of transceivers each having a different address and connected in parallel to a network, each message containing characters for identifying the address of the sender and the address of the addressee of the message, comprising:
providing a single path bidirectional network;
continuously receiving at each transceiver any signals present on the network;
inhibiting transmission of any message signals to be sent by each transceiver as long as a signal originating from another transceiver is present on the network and received by the transceiver and setting a waiting time period before initiating transmission which is longer than a preset minimum waiting time after reception of said signal originating from another transceiver;
formatting the message signals by providing a start of message signal, signals corresponding to the addresses of the sender and the addressee, binary signals corresponding to characters of the message including preceding each message character with a binary start signal and following each message character with a binary end signal, and an end of message signal;
comparing at each transceiver message signals transmitted by the transceiver with message signals simultaneously received by the transceiver, interrupting the transmitted message signals in the absence of a proper comparison, and restarting transmission of the message signals in the absence of reception of other signals on the network over a time interval of random duration; and transmitting from each transceiver on the network the end of message signal upon the absence of the proper comparison between message signals being transmitted by the transceiver and those signals simultaneously received by the transceiver;

thereby enabling transmitter and receiver circuits in each transceiver to operate with different internal clock rates and allowing the formatting of the message signals to exclude signals corresponding to an encoded clock rate.

2. The method according to claim 1, characterised in that at the restart of an interrupted emission, the transceiver keeps listening to the network before restarting emission for a random duration longer than a predetermined minimum waiting time.

3. The method according to the claim 1, characterised in that the transceivers are in a quiescent state during transmission pauses: they enter a stand-by state when they receive a start of message signal and they fall back in the quiescent state if they do not receive after that a character identifying their address.

4. The method according to claim 1, characterised in that the start of message (12), end of message (17) and interruption characters are basically identical.

5. The method according to claim 1, characterised in that the interrupt characters comprise a continuous signal of duration longer than the duration of a normal message character.

6. The method according to claim 1, characterised in that the minimum predetermined waiting time (18) is at least equal to the transmission time of a character, increased of the internal processing time of a transceiver between the end of transmission of a character and the beginning of emission of the following one, increased of the signal propagation time between the extreme points of the network.

7. The method according to claim 1, characterised in that during the phase of comparison of the signal corresponding to the character emitted and the signals simultaneously monitored on the network, the comparison is made at the end of the character emission.

8. The method according to claim 1, characterised in that during the phase of comparison of the signals corresponding to the character emitted and the signals simultaneously monitored on the network, the comparison is made at the end of each binary signal of the characters.

9. The method according to claim 1, characterised in that the transceiver, after the initial reception phase, transmits a start of message character only if no character has been detected during this phase and if the network is in a quiescent state.

10. The method according to claim 1, characterised in that after reception of the end of message signal, the addressed transceiver sends back an acknowledge message before the minimum waiting time (22) is elapsed.

11. The method according to claim 10, characterised in that the acknowledge message contains at least the character indicating the addressee's address, the sender's address (23), and the end of message (25).

12. A serial asynchronous communication device capable of sending/receiving logical messages on a multipoint single path bidirectional network, comprising storage means to hold each character of the message to be transmitted, means to emit the serial binary signals which form a message, means for reception and storage of the signals received from the network, means (30) for generation of at least one character indicating the address of the sender and the address of the addressee (13), means (41 and 45) for comparison of the signals corresponding to the message to be transmitted and the signals corresponding to the message received simultaneously via the reception means (42), means (48) to inhibit transmission if the signals emitted and monitored on the network are different, characterised in that each transceiver additionally comprises:

means to organise messages in a stream of binary signals grouped in coded characters separated by intervals (10), without encoded clock, each character preceded by a start (6) binary signal and followed by an end of character signal (7);

timing means (47) to inhibit transmission for a duration (18) longer than a predetermined waiting time after the reception of the preceeding signal;

means (35, 58, 53, 37) to generate a start of message character (12);

means (34, 53, 37) to generate an end of message character (17);

means (41, 45) to generate and emit an end of message character if the signals transmitted and detected on the network are different.

13. The device according to claim 12, characterised in that the means (47, 48) to inhibit the emission for a random duration of time when the signals transmitted and detected on the network are different generate an inhibit state during a duration longer than a minimum predetermined waiting time.

14. The device according to claim 12, characterised in that it additionally comprises media to override the transmission inhibition and to send an acknowledge message without waiting for the minimum waiting delay.

15. The device according to the claim 12, characterised in that it comprises serial asynchronous transceivers (72) which perform the serialisation of the characters to be transmitted, the deserialisation of the characters received, and the generation and identification of the interruption characters.

* * * * *